Sept. 2, 1924.  E. NEY  1,507,414

COFFEE URN

Filed April 4, 1924

INVENTOR
Edward Ney
BY
Philip S. McLean
ATTORNEY

Patented Sept. 2, 1924.

1,507,414

UNITED STATES PATENT OFFICE.

EDWARD NEY, OF NEW YORK, N. Y.

COFFEE URN.

Application filed April 4, 1924. Serial No. 704,089.

*To all whom it may concern:*

Be it known that I, EDWARD NEY, a citizen of the United States, and a resident of New York, county and State of New York, have invented certain new and useful Improvements in Coffee Urns, of which the following is a specification.

This invention relates particularly to coffee urns of the combination type in which water is heated in a compartment surrounding the jar or coffee container and in which the body of hot water is used to provide the heat for the coffee. In the operation of these urns a so-called "water stone" or lime stone gradually builds up on the walls of the water chamber forming a heat insulating lining which materially reduces the thermal efficiency of the urn. As heretofore constructed, it is impossible to remove this lining or incrustation without unsoldering joints and taking the urn completely apart. As a result, rather than take them apart, these urns have been continued in operation when their thermal efficiency was greatly lowered and when for sanitary reasons they should have been thoroughly cleansed.

Special objects of this invention are to provide a simple, practical and inexpensive combination urn construction having provision for readily opening the same and making it possible to quickly cleanse all interior parts without unsoldering joints or breaking what would be considered permanent connections.

In the accompanying drawing there is illustrated a practical embodiment of the invention, wherein.

Figure 1:
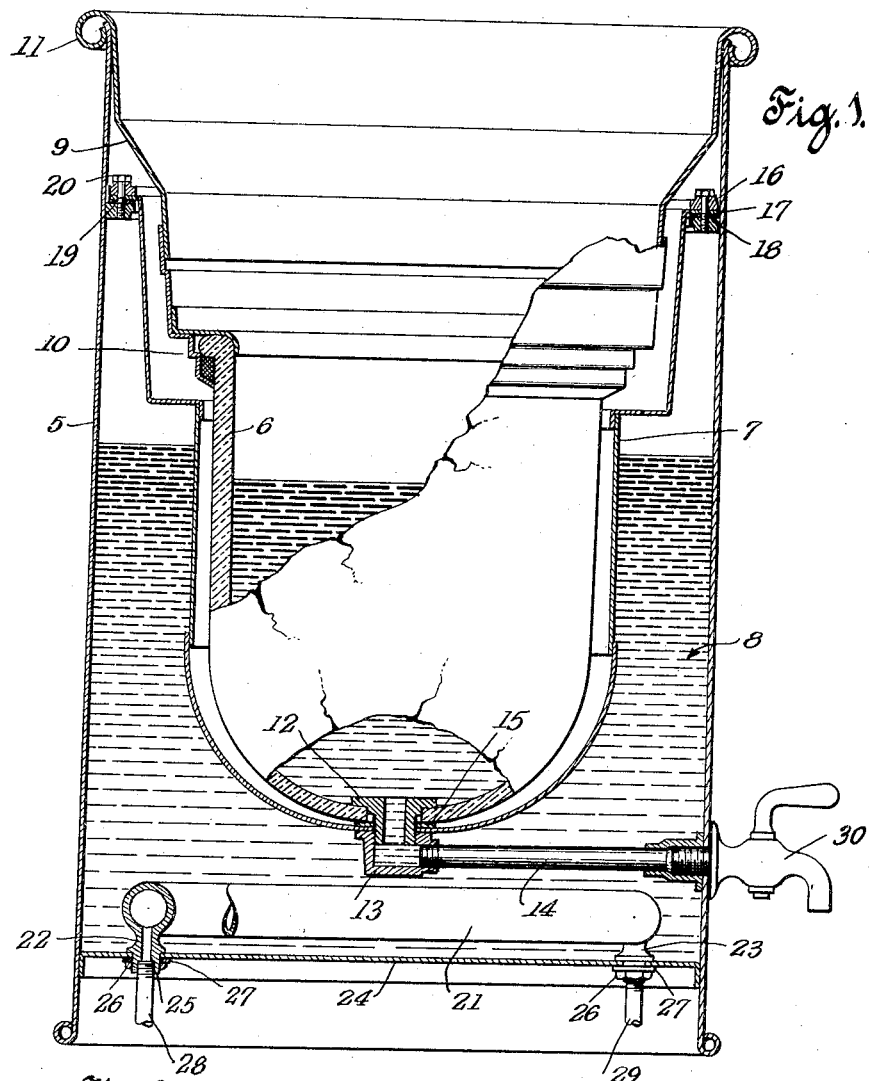
Figure 1 is a broken vertical sectional view of the urn.
Figure 2:
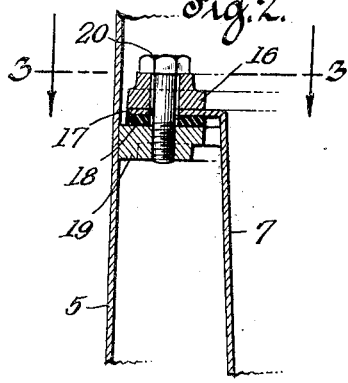
Figure 2 is an enlarged broken sectional view of the joint between the inner water jacket and the outer casing.
Figure 3:
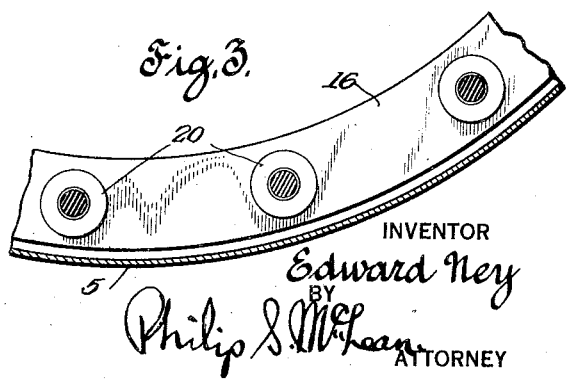
Figure 3 is a broken horizontal section of the same on substantially the plane of line 3—3 of Figure 2.

In the embodiment of the invention herein disclosed, the shell or case of the urn is designated 5, and the jar is indicated at 6 supported within the hollow of the jacket 7 which by cooperation with the surrounding wall of the case provides an annular water chamber 8.

The jar is shown as having an annular upward extension 9 connected at its lower end with the rim of the jar by a tight fitting joint 10 and having a curled over rim 11 at its upper end slidably and adjustably fitting down over the edge of the case.

The bottom of the jar is held in place and connected with an outlet by a flanged coupling 12, screwing down into an outlet fitting 13 connected with the discharge pipe 14 leading to the faucet or other discharge device at the outside of the urn. This construction makes it possible to lift out the annular extension and with it, the jar, upon simply removing the screw coupling 12.

The annular or bowl shaped wall 7 which forms the water jacket is made readily removable from the casing by securing it at the bottom between the outlet fitting 13 and a washer or gasket 15 at the bottom of the jar and by securing it at the top by a clamp ring 16 overstanding an outwardly turned flange 17 at the rim of such jacket and forcing the same against a gasket 18 on the internal annular shoulder 19 of the outer casing. This clamping ring is shown as held in place by a series of bolts 20 which are exposed upon the removal of the jar.

The water jacket forming wall is thus firmly supported in position by a tight joint with the casing but when desired, can be quickly removed from the casing after simply taking out the screw coupling, lifting out the jar and then taking off the clamping ring.

The removal of this jacket member it will be seen, exposes the entire interior of the casing so that all parts of the same can be reached for cleaning and for chipping off the water stone or lime stone where the same is found to be hardened to an extent requiring chipping operations. The complete removal of the jacket enables that part to be readily cleaned both inside and out.

The heating of the water is shown as effected in the present disclosure by a steam ring 21 in the bottom of the water compartment. This ring also is made readily removable in the present disclosure by supporting it on hollow pedestals 22, 23, having flanges resting on the bottom 24 of the casing and neck portions 25 extending down through the bottom and having nuts 26 turned up on the same into clamping engagement with suitable gaskets or washers 27. The steam inlet and outlet pipes 28, 29 are shown as threaded into the extensions or necks of the pedestals.

It will be clear from this that upon disconnection of the steam pipes and removal of the clamp nuts 26, the heating coil may be lifted out of the bottom of the casing and entirely clear of the urn. This ready removability is particularly important for the purpose of removing scale from the heating coil and for otherwise cleaning and repairing the same.

The faucet which is indicated at 30 is preferably so arranged that upon unscrewing the same, the outlet piping 14 with the fixture 13 can be entirely removed and taken out of the way when the steam ring is to be removed. The invention thus makes it possible to remove any or all the inner parts of the urn for cleaning, inspection or repair purposes and this without shifting the casing or disturbing its setting.

What is claimed is:

1. A combination coffee urn of the character disclosed comprising a casing having a continuous fixed shoulder on the inner wall of the same, a gasket seated on said shoulder, an annular shell within the casing having a flanged rim engaged with said gasket, a continuous clamping ring bearing on said flanged rim, a plurality of screw bolts securing said clamping ring to the annular shoulder with the gasket and the flanged rim of the shell interposed therebetween and thereby providing a closed but readily opened annular water chamber between the casing and shell, a jar within the shell having an upper annular extension covering the detachable fastening means for the water jacket shell and having a readily detachable engagement with the upper end of the casing, whereby upon removal of said jar access will be provided to the fastening means for the water jacket shell, which fastening means can then be released to permit removal of the water jacket shell and consequent exposure of the entire interior of the casing and outlet connections extending from the jar through the shell, readily detachable to enable first the removal of the jar and then the removal of the shell.

2. A combination coffee urn of the character disclosed comprising a casing having a continuous fixed shoulder on the inner wall of the same, a gasket seated on said shoulder, an annular shell within the casing having a flanged rim engaged with said gasket, a continuous clamping ring bearing on said flanged rim, a plurality of screw bolts securing said clamping ring to the annular shoulder with the gasket and the flanged rim of the shell interposed therebetween and thereby providing a closed but readily opened annular water chamber between the casing and shell, a jar within the shell having an upper annular extension covering the detachable fastening means for the water jacket shell and having a readily detachable engagement with the upper end of the casing, whereby upon removal of said jar access will be provided to the fastening means for the water jacket shell, which fastening means can then be released to permit removal of the water jacket shell and consequent exposure of the entire interior of the casing, outlet connections extending from the jar through the shell, readily detachable to enable first the removal of the jar and then the removal of the shell and a heating coil detachably secured on the bottom of the casing beneath the shell where it will be exposed by the removal of the shell and completely removable from the casing after such removal of the shell.

In witness whereof, I have hereunto set my hand this 29th day of March, 1924.

EDWARD NEY.